May 21, 1957  H. O. SEIGEL ET AL  2,792,637
APPARATUS FOR SURVEYING DRILL HOLES
Filed Jan. 15, 1952  2 Sheets-Sheet 1
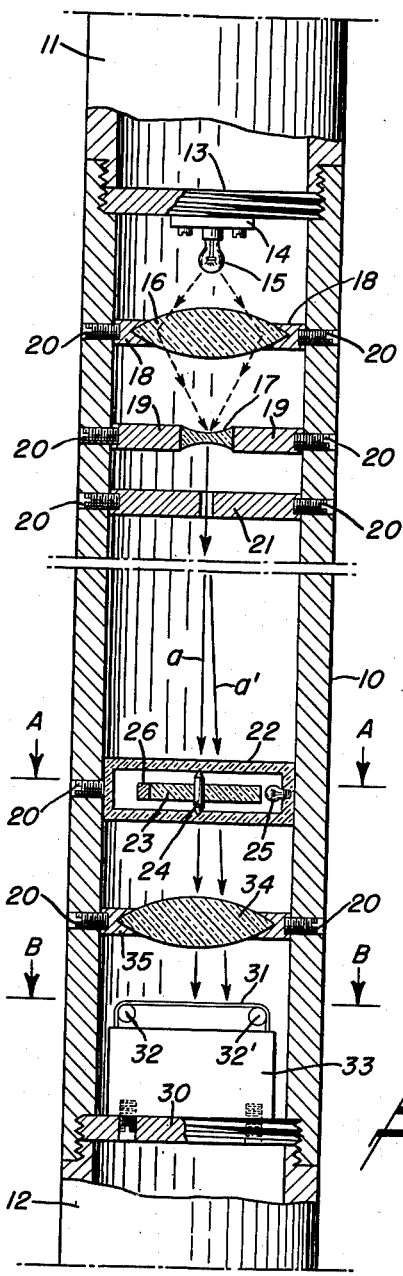
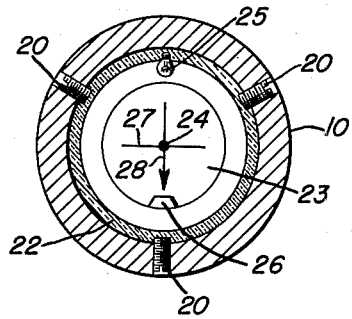
Fig-2
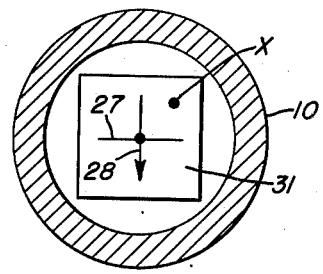
Fig-3
Fig-1
HAROLD O. SEIGEL and
WILLIAM E. BELL
INVENTORS
BY
ATTORNEYS

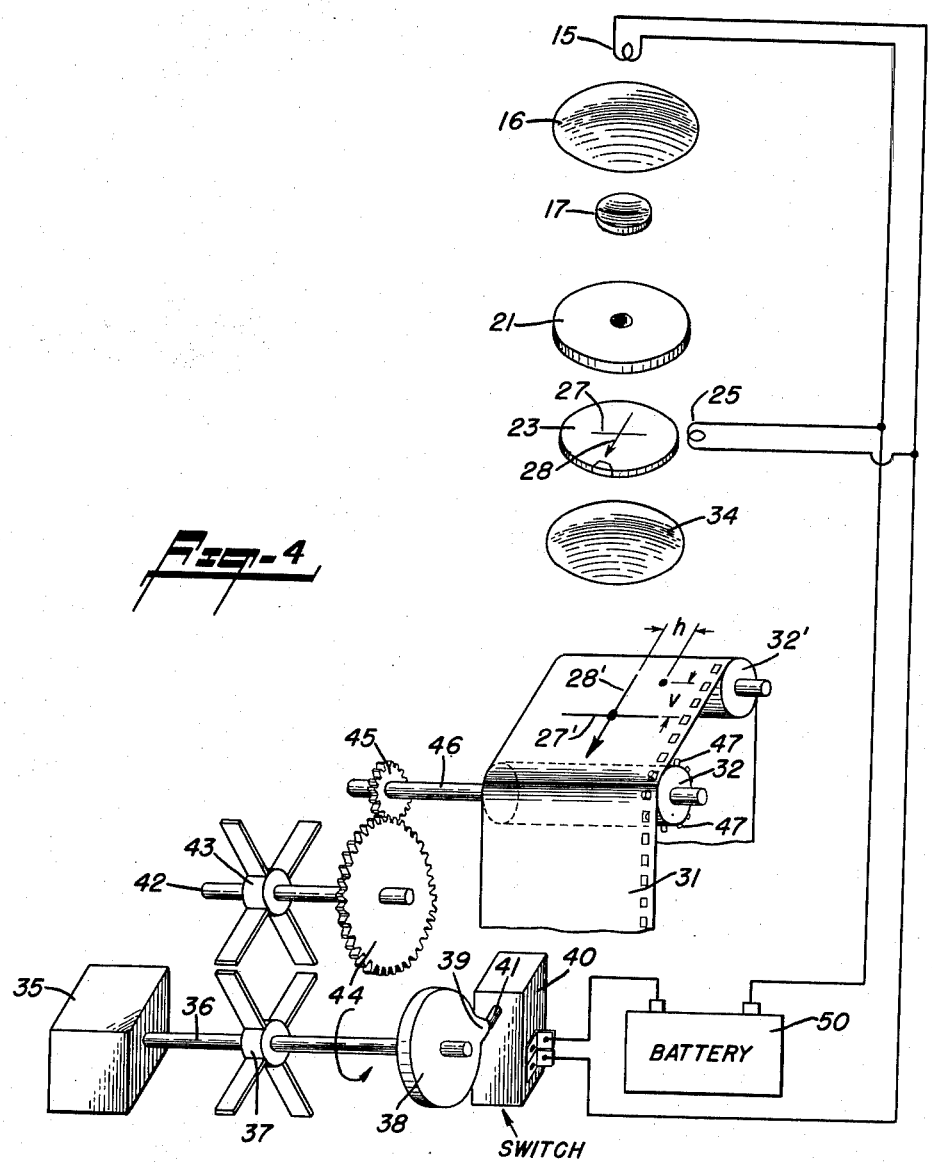

2,792,637
Patented May 21, 1957

2,792,637
APPARATUS FOR SURVEYING DRILL HOLES

Harold O. Seigel and William E. Bell, Jerome, Ariz., assignors to Newmont Mining Corporation, New York, N. Y., a corporation of Delaware Application January 15, 1952, Serial No. 266,482

4 Claims. (Cl. 33—205.5)

This invention relates to a method and apparatus for surveying a drill hole and more particularly to a novel method and apparatus for determining the rate of deflection of a drill hole with respect to a reference axial line of the hole.

The apparatus, to be described hereinbelow, may be utilized in any drill hole including such holes as may be metal encased or which are formed in highly magnetic rock or ore.

The invention contemplates the provision of a semi-rigid, hollow tube, or rod, having an outside diameter corresponding to that of the drill rods employed to drill the hole in the first instance. Such tube carries the apparatus required to make the desired record. Specifically, one end of the tube carries an axially-disposed light source and a suitable optical system providing a small-diameter beam of substantially parallel light rays, the axis of the light beam normally coinciding with the axis of the tube. Disposed in the opposite end of the tube is a driving mechanism adapted for selected movement of a photographic film that is disposed in a plane substantially normal to the light beam. Interposed between the light source and the film is a light-permeable, pivotally-mounted disc carrying crossed reference lines and means for projecting such lines upon the film during such periods as a film record is to be made. When the semi-rigid tube is straight throughout its axial length the light beam will fall at the point of intersection of the crossline image on the film. However, when the tube is deformed axially, the light beam will fall in some quadrant defined by the cross lines. These recorded, angular deviations of the light beam can be converted into the actual inclined position of the drill hole at any point along its length, provided the individual recordings are related to the distance of the apparatus from the collar of the hole at the time the individual recordings are made.

An object of this invention is the provision of apparatus for recording the relative axial disposition of a drill hole at selected points along the length of the hole.

An object of this invention is the provision of novel apparatus for recording deviations of a drill hole and which comprises a semi-rigid tube carrying a light source, an optical system for providing a substantially parallel light beam along the tube axis, a light sensitive film exposed to the light beam at selected intervals of time, gravity-actuated reference means disposed within the path of the light beam and means for providing an image of the light beam and reference means upon the film.

An object of this invention is the provision of drill-hole-surveying apparatus comprising a semi-rigid tube adapted for coupling to a series of drill rods, a source of light axially-disposed in one end of the tube, optical means for converting light rays emanating from the source into a parallel beam of light rays normally coinciding with the axis of the tube, a mechanism disposed within the other end of the tube and adapted to move a light-sensitive film across the beam of light rays, a pivotally-mounted, light-permeable member intersecting the beam of light rays, crossline reference markings on said pivotally-mounted member, an eccentrically-mounted weight on said member, a second source of light spaced from the said member and control means for simultaneously energizing both light sources.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is a general, longitudinal, cross-sectional view taken through the tube that carries the apparatus, with certain parts shown in elevation for purposes of clarity;

Figure 2 is a transverse section taken along the line A—A of Figure 1;

Figure 3 is a transverse section taken along the line B—B of Figure 1; and

Figure 4 is a diagrammatic representation and a circuit diagram of apparatus that is self-contained within the tube and automatic in operation.

Referring now to Figure 1, the apparatus required for the practice of our invention is disposed within a semi-rigid, steel tube 10 that may be provided with standard couplings so that it can be connected into the conventional string of drill rods. As shown in the drawing, the tube 10 is provided with threaded ends for coupling to the drill rods 11 and 12. It may here be pointed out that the tube 10 is water tight and capable of withstanding up to 2000 pounds per square inch of water pressure. Such tube normally has a length of approximately 10 feet and although the wall thickness of the tube is exaggerated in the drawing, the tube is subject to axial deformation, or bending, as the series of rods is inserted into a drill hole. Threaded into the upper end of the tube 10, is a base 13 that carries a suitable socket 14 accommodating the lamp 15, the latter being positioned on the tube axis. Light rays from the lamp 15 are collected by the lens 16 and collimated by the lens 17 whereby a narrow beam of substantially-parallel light rays is directed through the tube exactly along the tube axis, when the tube is straight through-out its length. The lenses 16 and 17 are supported by suitable mounting rims 18, 19, respectively, which rims are secured to the tube by the screws 20. A suitable, opaque baffle plate 21 is similarly secured to the tube and is provided with a small aperture through which the parallel-ray, light beam passes.

Secured within the tube, at the lower end, is a cell 22, made of a transparent plastic, that carries a circular disc 23, also made of a transparent plastic, said disc being pivotally mounted within the cell by means of the staff 24. Thus, the disc 23 is adapted for rotation about the tube axis. The cell 22, secured in position by screws 20, is fluid tight and filled with a suitable fluid which serves to damp rotational movement of the disc. A small lamp 25 is secured to the cell 22 and spaced from the edge of the disc 23, and a small osmium weight 26, whose weight is large compared to that of the disc, is secured to the disc, all for the purposes now to be described.

Reference is now made to Figure 2 which is a transverse, cross-sectional view taken along the line A—A of Figure 1, the line A—A defining a plane corresponding to the top surface of the pivotally-mounted disc 23. Such top surface of the optically-transparent disc carries crosslines 27, 28, the latter having an arrow at the end proximate to the osmium weight 26. These cross lines are scratched in the surface of the disc and filled with opaque ink and are projected by the lens 34 on the film 31. The cross lines 27, 28 serve as reference lines, as will be explained hereinbelow, it being apparent the weight 26 will cause rotation of the disc so as to maintain the reference line 28 in the plane of maximum tilt at all times. When the lamp 25 is energized, light rays emanating therefrom pass into the transparent disc and are dispersed so as to form a light image of the opaque cross-lines on any surface spaced from the disc and substantially parallel thereto.

Referring again to Figure 1, a base 30 is threaded into the lower end of the tube 10, said base carrying a suitable mechanism for driving a photographic film 31 over the rollers 32, 32'. The mechanism is enclosed within a suitable housing 33 and may be of any suitable type as, for example, a spring-wound clock-works or an electric clock-motor with suitable gearing. In any case, the mechanism is such that it will move the film a predetermined amount at predetermined points in the operating cycle of the entire apparatus, as will be described with reference to Figure 4. The film 31 is disposed in a plane normal to the axis of the tube 10 and is exposed to light coming through the tube. Disposed between the film 31 and the disc 23 is a lens 34 supported by a rim 35. Thus, when the lamp 25, disposed within the cell 22, is energized, an image of the reference cross-lines 27, 28, will be projected on the surface of the film, as shown in Figure 3 which is a transverse, sectional view taken along the line B—B of Figure 1. Assuming both of the lamps 15 and 25 are energized, the image on the film will comprise the cross-lines 27, 28 and the beam a' emanating from the lamp 15. If, now, the tube 10 is straight, the image of the beam emanating from the lamp 15 will coincide with the point of intersection of the cross-lines. If, however, the tube 10 is deformed, the beam from the lamp 15 will deviate from the tube axis (as shown by the beam a') and its image, on the film, will be displaced from the point of intersection of the cross-lines, as shown by the point X in Figure 3. The specific location of the points X (on the separate, exposed portions of the film), with reference to the image of the cross-lines 27, 28 (the latter always indicating the plane of maximum tilt), serves to establish the changes in the inclined position of the drill hole (from the initial, or reference, axial line of the hole) at points corresponding to those at which the film has been exposed.

As stated above, the tube 10 preferably is water-tight. For this purpose the threads on the base plates 13 and 30 can be coated with a suitable compound, and the holes (in the wall of the tube) within which the fastening screws 20 are disposed may likewise be sealed with such compound. When the apparatus is to be controlled from a surface location, wires from the lamps and the film driving motor can be run upward through the tube, through suitable holes in the various lens-supporting rims, baffle, etc., and brought to the surface through the upper drill rods, such as the rod 11. In such arrangement the operator can insert the tube 10 a known distance into the drill hole, energizing the lamps to make a record upon the film, insert the tube 10 to another known point in the drill hole, energize the film-driving motor to move the film to a new unexposed section, energize the lamps to obtain another record, etc. However, we prefer to make the apparatus entirely automatic in operation and self-contained within the tube 10. This is accomplished by using a spring-wound driving motor for the film together with a suitable switch mechanism for energizing the lamps from a small battery disposed within the housing 33.

Reference is now made to Figure 4 which is a circuit diagram of the apparatus, with the related parts of Figure 1 shown diagrammatically. A suitable, spring-wound, clockwork mechanism is disposed within the container 35, such mechanism including a suitable gearing whereby the shaft 36 will rotate at a predetermined speed. The shaft 36 carries a four-spoke member 37 and a cam 38 having a lobe 39 thereon. A small switch 40, of the normally-open type, is adapted for actuation by the plunger 41 that rides on the periphery of the cam. Thus, in the illustrated arrangement, the contacts of the switch will close, for a short interval of time, once for each revolution of the cam. Such contact closure completes the electrical circuit between the battery 50 and the lamps 15 and 25. A second shaft 42 carries a four-spoke member 43, that is operatively associated with the similar member 37, and a gear 44 that meshes with the small gear 45 secured to the shaft 46. The photographic film 31 is disposed over the rollers 32, 32', the former being secured to the shaft 46 and including radial-extending pins 47 which cooperate with the apertures at one edge of the film whereby the film is moved in response to rotation of the roller 32. The entire mechanism and apparatus illustrated in Figure 4 is contained within the semi-rigid tube 10, see Figure 1.

The ratio of the gears 44, 45 is so selected that one revolution of the driving gear 44 will move the film 31 a sufficient distance to bring an unexposed portion of the film into proper operating position. Further, the relationship between the spoked-member 37 and the cam 38 is such that the switch 40 is closed only during the time interval when the film is stationary. If we assume a substantially-constant rotation of the shaft 36, at say, one revolution per minute, it will be clear that the operating cycle of the apparatus is one minute. As the shaft 36 rotates, the member 37 imparts a step-by-step rotation to the cooperating member 43, resulting in a step-by-step advancement of the film 31 by reason of the gears 44, 45. After the fourth such discrete movement of the film a completely new, unexposed portion of the film is presented to such light rays as may pass downwardly through the semi-rigid tube. The switch 40 now is closed by the cam lobe whereby the lamps 15, 25 are energized. The resulting image on the film comprises the cross-lines 27', 28' (corresponding to the opaque cross-lines 27, 28 on the pivotally-mounted, gravity-responsive, transparent disc 23) and the spot X (resulting from the light beam a', Figure 1, coming from the lamp 15). The image, or spot X, is displaced from the point of intersection of the cross-line image 27', 28', only when the containing tube is deformed with respect to its normal axis. Conversely, if the tube is straight, the image X will fall upon the point of intersection of the cross-lines.

The reference line 28 will aline itself always in the plane of maximum tilt. As long as the drill hole has any inclination other than vertical, a gravity component will act on the small osmium weight 26 thereby pivoting the disc so that the cross line 28 comes to lie in the vertical, longitudinal plane with the arrow downward. The actual plane of the disc is, of course, perpendicular to the dip of the hole. Thus, cross lines 27 and 28 always form reference axes with line 28 in a vertical plane and line 27 in a horizontal plane, and the plane in which the cross lines lie is perpendicular to the hole dip, or axis.

In practice, the rod 10 has a length of 10 feet. In such case the rod axis is a gentle curve. The beam of light "a," which travels in a straight line, appears to have shifted to the point X, Figure 3, relative to the axial line of the hole. This shift is resolved into two (2) components along the reference lines 27, 28, the two reference directions being simultaneously photographed on the film 31. The components of the position X, measured along the lines 27 and 28, represent the deflection of the hole in a 10 foot length of the containing tube 10, in and perpendicular to the plane of maximum tilt.

Obviously, it is necessary only to know the starting direction of the drill hole. Thereafter, it is immaterial how the hole wanders; its position in space can be followed.

Starting at the top of a hole of arbitrary azimuth and inclination, we know the initial direction and inclination setting of the hole. Let this define the reference axial line and the vertical plane containing this line, the reference plane. Let us make a recording here and let the components of the deflection of the point X, Figure 3 be $h$ and $v$, see Figure 4, where the arrow on the line 28 represents downward in the plane of maximum tilt and line 27 can be adjudged left or right, as the point X lies to the left or right of line 28. The deflection of the hole, then, at this point is at the rate of $v$ feet per 10 foot of hole length in the plane of maximum tilt (up or down as the point X lies above or below line 27) and $h$ feet per 10 foot of hole length to the right or left as the point X lies to the right or left of the line 28.

In general practice we would take such readings at points in the hole 100 feet apart. The deflections of the point X, at the start of the drill hole would then be multiplied by 5 to give the position, in space, of a point $P_1$ at a distance of 50 feet down the hole along the initial axial reference line. The rates of deflection, per 10 feet of hole length, read off at the 100 foot station and multiplied by 5, will give the actual deflections along the reference lines 27, 28 of a position $P_2$ that is spaced 100 feet from the $P_1$ position. Simply adding these actual deflections to the position of $P_1$ gives the position $P_2$. The rate of deflection of $P_2$ would be carried another 50 feet to give the position of the hole $P_3$ at 150 feet. Similarly, the rate of deflection observed at 200 feet down the hole would serve to give the position of the hole $P_4$, at 200 feet, and $P_5$ at 250 feet, relative to the axial reference line.

The switch 40 remains closed only for a brief instant sufficient to make an image on the film, after which the operating cycle is repeated. It will now be clear the apparatus results in a periodic movement of the photographic film and a periodic recording of the disposition of the light beam relative to fixed reference lines. The operator synchronizes the lowering of the apparatus so that sufficient time is allocated for the disc to come to rest before the record is taken. The position of the apparatus in the hole is noted for each record exposure whereby the individual records can be related to known distances from the collar of the hole.

The sensitivity of the device herein disclosed, increases as the square of the length of the rod, sensitivity being defined as the linear deflection of the end of the light beam per unit change of angle per unit length of the drill hole. For example, a 10 foot rod, or tube, having an internal diameter of 1 inch will provide a full scale deflection of 0.5 inch for only 1.4 minutes change of the angle per foot. A deflection of only 1/10 this amount can be observed quite readily in the arrangement described above.

In actual practice, the semi-rigid tube, containing the apparatus, can have an outside diameter corresponding to the smallest drill rod in general use and can be adapted for use in larger-diameter drill holes by the addition of an appropriate outer sleeve and/or couplings. When in use, several sections of drill rod are rigidly coupled to each end of the semi-rigid tube to reduce the influence of small differences between the diameter of the drill hole and the diameter of drill rods and the tube.

Having now described our invention certain variations and modifications in the individual parts and their interrelated assembly will be apparent to those skilled in this art. While we have shown a construction wherein certain individual parts are secured within the tube by means of fastening screws threaded through the tube wall, these parts may be spaced apart and secured in relatively fixed position by a series of spring-type hollow bushings frictionally engaging the inner wall of the tube. The film-driving mechanism is also subject to a wide latitude in design to meet desired or required conditions. Further, the photographic film may be of the automatic development type including a developer strip backing. Such, and other changes and modifications, may be made without departing from the scope and spirit of the invention as recited in the following claims.

We claim:

1. Apparatus for use in determining the positions in space of predetermined points in a drill hole and with reference to the axis of the drill at its collar, said apparatus comprising a tube capable of lateral bending; means coupling a drill rod to an end of the tube for forceably inserting the tube a predetermined distance into the drill hole; means carried by the tube and forming a mutually perpendicular set of coordinate reference lines lying in a plane normal to the axis of the tube, said reference lines intersecting each other on the axis of the tube; gravity-actuated means maintaining said reference lines in a fixed orientation in the plane of maximum tilt of the tube; and means carried by the tube for periodically recording the angular bending of the tube between a spaced point on the tube axis and the said reference lines.

2. The invention as recited in claim 1, wherein the means forming the reference lines comprises a light-permeable disc pivoted for rotation about the tube axis and said reference lines are carried by the said disc; and the gravity-actuated means comprises a weight eccentrically mounted on the said disc.

3. The invention as recited in claim 2, wherein the means periodically recording the angular bending of the tube comprises a light source disposed at the said spaced point on the tube axis, means for periodically energizing said light source, and a photographic film periodically exposed to light passing through the said light-permeable member.

4. Apparatus for use in establising changes in direction at predetermined points in a drill hole and with reference to the axis of the drill hole at its collar, said apparatus comprising a tube capable of lateral bending; a light source disposed within one end of the tube; an optical system converting light rays from the source into a narrow beam of light directed along the tube axis when the tube is straight; a photographic film disposed within the other end of the tube; means for periodically exposing sections of the film to the said light rays; a light-permeable disc disposed between the light source and film and spaced a predetermined distance from the light source, said disc being pivotally mounted for rotation about the axis of the tube; a pair of mutually-perpendicular lines carried by the said disc, said lines intersecting each other on the axis of the tube; and a weight eccentrically mounted on the said disc.

References Cited in the file of this patent

UNITED STATES PATENTS

| | | |
|---|---|---|
| 1,959,141 | Sperry | May 15, 1934 |
| 2,098,476 | Webster | Nov. 9, 1937 |
| 2,656,505 | Hewitt | Oct. 20, 1953 |

FOREIGN PATENTS

| | | |
|---|---|---|
| 443,102 | France | July 6, 1912 |
| 14,780 | Great Britain | 1915 |
| 351,745 | Great Britain | July 2, 1931 |
| 36,238 | Holland | Sept. 16, 1935 |

OTHER REFERENCES

Anderson publication, "Underground Survey of World's Deepest Well, etc.," The Oil Age, September 1926.